(12) United States Patent
Kaneko

(10) Patent No.: US 11,605,109 B2
(45) Date of Patent: Mar. 14, 2023

(54) SEARCH SYSTEM, SEARCH METHOD AND PROGRAM

(71) Applicant: Rakuten Group, Inc., Tokyo (JP)

(72) Inventor: Kosuke Kaneko, Tokyo (JP)

(73) Assignee: Rakuten Group Inc., Tokyo (JP)

( * ) Notice: Subject to any disclaimer, the term of this patent is extended or adjusted under 35 U.S.C. 154(b) by 13 days.

(21) Appl. No.: 17/056,807

(22) PCT Filed: Sep. 27, 2019

(86) PCT No.: PCT/JP2019/038290
§ 371 (c)(1),
(2) Date: Nov. 19, 2020

(87) PCT Pub. No.: WO2021/059513
PCT Pub. Date: Apr. 1, 2021

(65) Prior Publication Data
US 2021/0374804 A1 Dec. 2, 2021

(51) Int. Cl.
*G06Q 30/02* (2012.01)
*G06Q 10/08* (2012.01)
*G06Q 30/0251* (2023.01)
*G06Q 10/087* (2023.01)

(52) U.S. Cl.
CPC ....... *G06Q 30/0257* (2013.01); *G06Q 10/087* (2013.01); *G06Q 30/0256* (2013.01)

(58) Field of Classification Search
USPC ............................................. 705/14.1, 14.55
See application file for complete search history.

(56) References Cited

U.S. PATENT DOCUMENTS

| 6,269,361 B1 | 7/2001 | Davis et al. |
| 11,520,559 B2* | 12/2022 | Dion ............. G06Q 30/0601 |
| 2006/0155598 A1* | 7/2006 | Spurr ............. G06Q 30/0251 |
| | | 705/14.71 |
| 2008/0104031 A1* | 5/2008 | Grasso ............. G06Q 30/0256 |
| 2014/0143054 A1* | 5/2014 | Celik ............. G06Q 10/087 |
| | | 705/14.54 |

(Continued)

FOREIGN PATENT DOCUMENTS

| JP | 2002-007423 A | 1/2002 |
| JP | 2003-501729 A | 1/2003 |

OTHER PUBLICATIONS

An_approach_to_cover_more_advertisers_in_Adwords (Year: 2015).*

(Continued)

*Primary Examiner* — Gautam Ubale
(74) *Attorney, Agent, or Firm* — Sughrue Mion, PLLC

(57) ABSTRACT

Search means (101) of a search system (1) connected to a terminal (30) via a network executes a search based on a search condition input from the terminal (30). Determination means (102) determines, based on stock information on each of a plurality of items included in search results obtained by the search means (101), whether there is a stock of each item. Advertisement acquisition means (104) acquires at least one advertisement of an item that satisfies the search condition and has a stock, based on results of determination by the determination means (102). Display control means (105) displays, on a search result screen, at least one item in stock among the search results and at least one advertisement.

10 Claims, 10 Drawing Sheets

(56) References Cited

U.S. PATENT DOCUMENTS

| | | | | |
|---|---|---|---|---|
| 2014/0280292 A1* | 9/2014 | Skinder | ............... | G06F 16/3338 |
| | | | | 707/767 |
| 2015/0248707 A1* | 9/2015 | Mi | ......................... | G06Q 50/12 |
| | | | | 705/14.66 |
| 2017/0039619 A1* | 2/2017 | Barraud | .................. | G06Q 50/14 |
| 2020/0034872 A1* | 1/2020 | Chapoutot | ........... | G06Q 10/025 |
| 2020/0051025 A1* | 2/2020 | Gerace | ............... | G06Q 30/0273 |
| 2021/0374804 A1* | 12/2021 | Kaneko | .................. | G06Q 30/02 |

OTHER PUBLICATIONS

Internet Advertising An Interplay among Advertisers Online Publishers Ad Exchanges and Web Users (Year: 2012).*
Price_Information_Patterns_in_Web_Search_Advertising_An_Empirical_Case_Study_on_Accommodation_Industry (Year: 2013).*
Office Action of Japanese Application No. 2020-539118 dated Nov. 4, 2020.
International Search Report of PCT/JP2019/038290 dated Dec. 17, 2019.

* cited by examiner

| FACILITY ID | FACILITY INFORMATION | | | ROOM INFORMATION | | |
|---|---|---|---|---|---|---|
| | FACILITY NAME | ADDRESS | CONTACT INFORMATION | ROOM ID | ROOM NAME | MAXIMUM CAPACITY |
| h00001 | AAA HOTEL | ..., TOKYO | 03-XXXX-XXXX | r10001 | STANDARD ROOM | 2 |
| | | | | r10002 | SUPERIOR ROOM | 2 |
| | | | | r10003 | SUITE ROOM | 6 |
| | | | | ... | ... | ... |
| h00002 | BBB HOTEL | ..., TOKYO | 03-YYYY-YYYY | r20001 | SINGLE ROOM | 1 |
| | | | | r20002 | DOUBLE ROOM | 2 |
| | | | | r20003 | TWIN ROOM | 2 |
| | | | | ... | ... | ... |
| h00003 | CCC HOTEL | ..., TOKYO | 03-ZZZZ-ZZZZ | r30001 | STANDARD TWIN | 2 |
| | | | | r30002 | SUPERIOR TWIN | 2 |
| | | | | r30003 | JUNIOR SUITE | 5 |
| | | | | ... | ... | ... |
| ... | ... | | | | | |

| FACILITY ID | ROOM ID | DATE OF USE | STOCK INFORMATION |
|---|---|---|---|
| h00001 | r10001 | ⋮ | ⋮ |
| | | 2019/10/4 | 8 |
| | | 2019/10/5 | 6 |
| | | 2019/10/6 | 2 |
| | | ⋮ | ⋮ |
| | r10002 | ⋮ | ⋮ |
| | | 2019/10/4 | 15 |
| | | 2019/10/5 | 0 |
| | | 2019/10/6 | 7 |
| | | ⋮ | ⋮ |
| | r10003 | ⋮ | ⋮ |
| | | 2019/10/4 | 9 |
| | | 2019/10/5 | 4 |
| | | 2019/10/6 | 3 |
| | | ⋮ | ⋮ |
| | ⋮ | ⋮ | ⋮ |
| h00002 | r20001 | ⋮ | ⋮ |
| | | 2019/10/4 | 16 |
| | | 2019/10/5 | 4 |
| | | 2019/10/6 | 6 |
| | | ⋮ | ⋮ |
| | r20002 | ⋮ | ⋮ |
| | | 2019/10/4 | 14 |
| | | 2019/10/5 | 5 |
| | | 2019/10/6 | 4 |
| | | ⋮ | ⋮ |
| | r20003 | ⋮ | ⋮ |
| | | 2019/10/4 | 13 |
| | | 2019/10/5 | 7 |
| | | 2019/10/6 | 3 |
| | | ⋮ | ⋮ |
| | ⋮ | ⋮ | ⋮ |
| ⋮ | ⋮ | ⋮ | ⋮ |

| FACILITY ID | ADVERTISEMENT CONDITION | | |
| --- | --- | --- | --- |
| | KEYWORD | REGION NAME | BID PRICE |
| h00001 | FAMILY, SIGHTSEEING, REASONABLE, ... | TOKYO | 15 YEN | ... |
| h00002 | BUSINESS, BED WITHOUT MEALS, ... | TOKYO | 20 YEN | ... |
| h00003 | BREAKFAST, SINGLE, ... | TOKYO | 12 YEN | ... |
| ... | ... | ... | ... | ... |

FIG.9

| UPPER LIMIT NUMBER OF ADVERTISEMENTS | SCHEDULE CONDITION | BID CONDITION | ... |
|---|---|---|---|
| 2 | COMING TWO WEEKS OR LESS | 5 YEN OR MORE | ... |

DB4

SEARCH SYSTEM, SEARCH METHOD AND PROGRAM

CROSS REFERENCE TO RELATED APPLICATIONS

This application is a National Stage of International Application No. PCT/JP2019/038290, filed Sep. 27, 2019.

TECHNICAL FIELD

The one embodiment of the present invention relates to a search system, a search method, and a program.

BACKGROUND ART

Hitherto, there has been known a technology called "search advertising", which displays an advertisement that depends on a search condition together with search results. For example, in Patent Literature 1, there is described a system configured to register advertisements (search listing) associated with a keyword, a bid price, and a network location in a database in advance, identify an advertisement that depends on a keyword input by a user, and display the identified advertisement in a search result list.

CITATION LIST

Patent Literature

[PTL 1] JP 2003-501729 A

SUMMARY OF INVENTION

Technical Problem

Application of the above-mentioned search advertising to an item that has a concept of stock is considered. In this case, an advertisement of an item in stock is displayed together with search results of the item in stock. However, when stock determination for displaying search results and stock determination for displaying an advertisement are separately executed, the stock determination is executed redundantly, resulting in increase in processing load on the system.

The one embodiment of the present invention has been made in view of the above-mentioned issue, and has an object to provide a search system, a search method, and a program, which are capable of reducing a processing load of stock determination.

Solution to Problem

In order to solve the above-mentioned issue, according to one embodiment of the present invention, there is provided a search system, which is connected to a terminal via a network, the search system including: search means for executing a search based on a search condition input from the terminal; determination means for determining, based on stock information on each of a plurality of items included in search results obtained by the search means, whether there is a stock of each item; advertisement acquisition means for acquiring at least one advertisement of an item that satisfies the search condition and has a stock, based on results of determination by the determination means; and display control means for displaying, on a search result screen, at least one item in stock among the search results and the at least one advertisement.

According to one embodiment of the present invention, there is provided a search method including the steps of: executing a search based on a search condition input from a terminal connected via a network; determining, based on stock information on each of a plurality of items included in search results obtained in the step of executing a search, whether there is a stock of each item; acquiring at least one advertisement of an item that satisfies the search condition and has a stock, based on the results of determination in the step of determining whether there is a stock; and displaying, on a search result screen, at least one item in stock among the search results and the at least one advertisement.

Further, according to one embodiment of the present invention, there is provided a program for causing a computer to function as: search means for executing a search based on a search condition input from a terminal connected via a network; determination means for determining, based on stock information on each of a plurality of items included in search results obtained by the search means, whether there is a stock of each item; advertisement acquisition means for acquiring at least one advertisement of an item that satisfies the search condition and has a stock, based on the results of determination by the determination means; and display control means for displaying, on a search result screen, at least one item in stock among the search results and the at least one advertisement.

According to one aspect of the present invention, the search system further includes holding means for holding the results of determination by the determination means, and the advertisement acquisition means is configured to acquire an advertisement list that depends on the search condition, and acquire the at least one advertisement based on the results of determination held by the holding means and the advertisement list.

According to one aspect of the present invention, the search system is connected to an advertisement system via a network, and the advertisement acquisition means is configured to request the advertisement system for the advertisement list, and acquire the advertisement list generated by the advertisement system.

According to one aspect of the present invention, an upper limit number of displayable advertisements is defined in advance for the search result screen, and the advertisement acquisition means is configured to acquire the advertisement list including a larger number of advertisements than the upper limit number, and acquire the upper limit number or less of advertisements based on the advertisement list.

According to one aspect of the present invention, the display control means is configured to display the search result screen that does not include the at least one advertisement when the at least one advertisement has not been acquired by a predetermined time limit.

According to one aspect of the present invention, the search condition includes a condition of at least one item input from the terminal among a plurality of items, and the advertisement acquisition means is configured to, when a condition of a predetermined item is not input from the terminal, acquire at least one advertisement of an item that satisfies a condition of the predetermined item, which is input from the terminal at a time of a past search, and has a stock.

According to one aspect of the present invention, the condition of the predetermined item includes a date of use, and the advertisement acquisition means is configured to acquire at least one advertisement of an item in stock on a date of use input from the terminal at the time of the past search, when the date of use is not input from the terminal.

According to one aspect of the present invention, the advertisement acquisition means is configured to acquire at least one advertisement of an item that satisfies the search condition and has a stock without using the date of use, when reservation for the date of use input from the terminal is complete.

Advantageous Effects of Invention

According to the one embodiment of the present invention, it is possible to reduce the processing load of stock determination.

BRIEF DESCRIPTION OF DRAWINGS

FIG. 6 is a table for showing an example of storage of data in a facility database.

FIG. 7 is a table for showing an example of storage of data in a stock database.

FIG. 8 is a table for showing an example of storage of data in a bid content database.

FIG. 9 is a table for showing an example of storage of data in an advertisement settings database.

DESCRIPTION OF EMBODIMENTS

1. Overall Configuration of Search System

Figure 1:
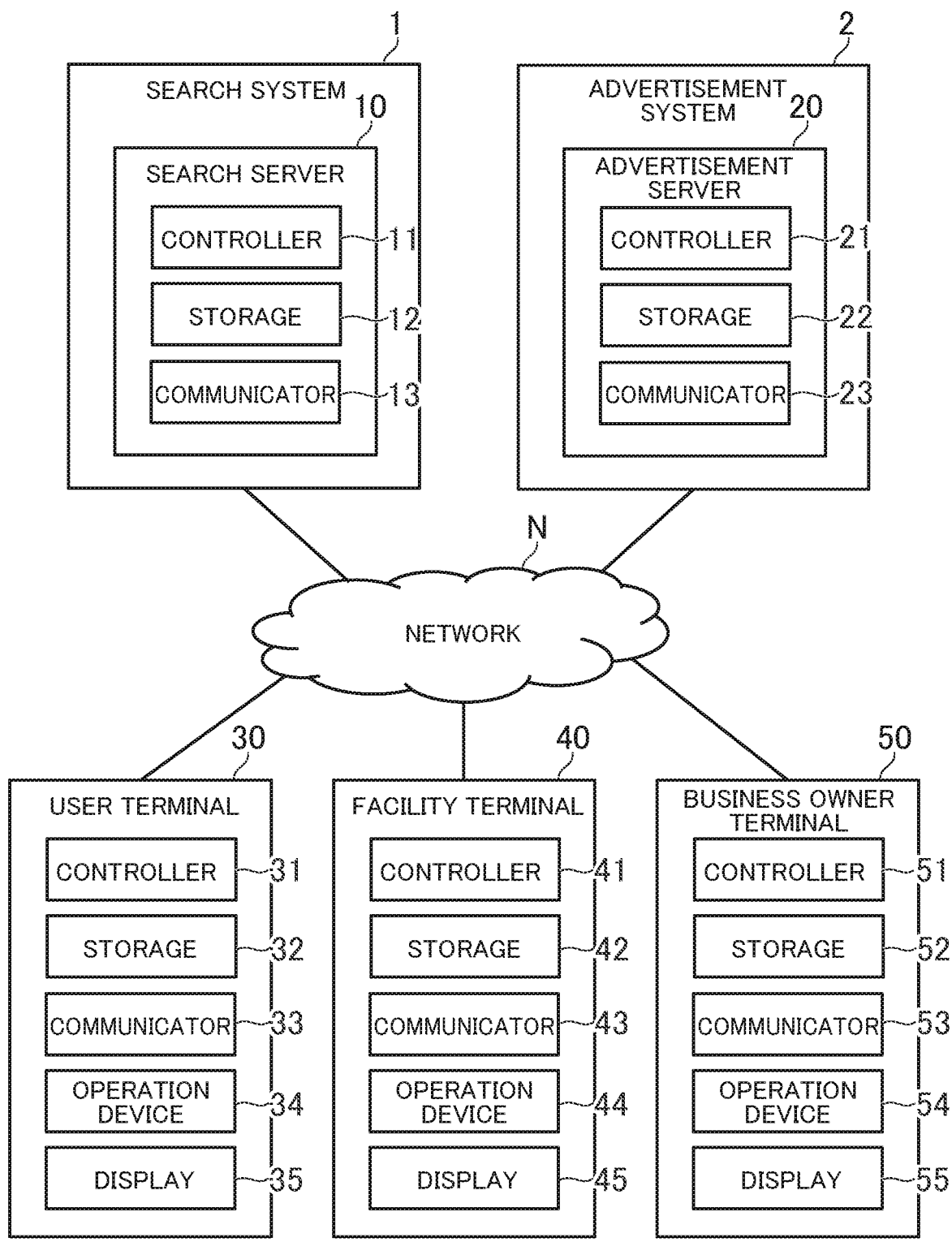
FIG. 1 is a diagram for illustrating an overall configuration of a search system and other components.

Now, description is made of an example of a search system according to an embodiment of the present invention. FIG. 1 is a diagram for illustrating an overall configuration of the search system and other components. As illustrated in FIG. 1, a search system 1 is connected to terminals via a network N. The network N is a network, for example, the Internet. For example, the search system 1 is connected to each of an advertisement system 2, a user terminal 30, a facility terminal 40, and a business owner terminal 50 via the network N. In FIG. 1, there is illustrated one user terminal 30, one facility terminal 40, and one business owner terminal 50, but there may be a plurality of each of those.

The search system 1 is a system configured to execute a search, and includes a search server 10, for example. The search system 1 is only required to include at least one computer, and may include a computer other than the search server 10.

The search server 10 is a server computer. The search server 10 includes a controller 11, a storage 12, and a communicator 13. The controller 11 includes at least one processor. The controller 11 is configured to execute processing in accordance with programs and data stored in the storage 12. The storage 12 includes a main memory and an auxiliary memory. For example, the main memory is a volatile memory, for example, a RAM, and the auxiliary memory is a non-volatile memory such as a ROM, an EEPROM, a flash memory, or a hard disk drive. The communicator 13 is a communication interface for wired communication or wireless communication, and performs data communication via the network N.

The advertisement system 2 is a system configured to manage an advertisement, and includes an advertisement server 20, for example. The advertisement is information (information for promoting conversion) for promoting purchase of a product or usage of a service. In other words, the advertisement is information for advertising a product or a service. The advertisement is electronically presented through an image. A so-called coupon is an example of the advertisement.

The advertisement system 2 is only required to include at least one computer, and may include a computer other than the advertisement server 20. Further, the search system 1 and the advertisement system 2 may be managed by the same entity or by different entities. Further, the search system 1 and the advertisement system 2 may not be divided, and functions of those systems may be implemented by one system.

The advertisement server 20 is a server computer. The advertisement server 20 includes a controller 21, a storage 22, and a communicator 23. The physical configuration of each of the controller 21, the storage 22, and the communicator 23 may be the same as those of the controller 11, the storage 12, and the communicator 13, respectively.

The user terminal 30 is a computer to be operated by a user. The user uses a service provided by the search system 1, and can also be referred to as "end user". For example, the user terminal 30 is a cell phone (including smartphone), a portable information terminal (including tablet computer), or a personal computer. In this embodiment, the user terminal 30 includes a controller 31, a storage 32, a communicator 33, an operation device 34, and a display 35. The physical configuration of each of the controller 31, the storage 32, and the communicator 33 may be the same as those of the controller 11, the storage 12, and the communicator 13, respectively.

The operation device 34 is an input device configured to receive any operation, and is, for example, a pointing device such as a touch panel and a mouse, a keyboard, or a button. The operation device 34 is configured to transmit details of operation by the user to the controller 31. The display 35 is, for example, a liquid crystal display or an organic EL display. The display 35 is configured to display an image in accordance with an instruction of the controller 31.

The facility terminal 40 is a computer to be operated by a staff member of the facility. The facility is a facility that can be reserved by the user. The search system 1 is configured to receive a reservation of the facility made by the user. The facility may be a facility of any type, and is, for example, an accommodation facility, a public facility, a tourist facility, or a sports facility.

For example, the facility terminal 40 is a cell phone (including smartphone), a portable information terminal (including tablet computer), or a personal computer. In this embodiment, the facility terminal 40 includes a controller 41, a storage 42, a communicator 43, an operation device 44, and a display 45. The physical configuration of each of the controller 41, the storage 42, the communicator 43, the operation device 44, and the display 45 may be the same as those of the controller 11, the storage 12, the communicator 13, the operation device 34, and the display 35, respectively.

The business owner terminal 50 is a computer to be operated by a business owner. The business owner is a provider of a service to the user. In other words, the business owner is a person who receives a request for placing an advertisement from the facility.

For example, the business owner terminal 50 is a cell phone (including smartphone), a portable information terminal (including tablet computer), or a personal computer. In this embodiment, the business owner terminal 50 includes a controller 51, a storage 52, a communicator 53, an operation device 54, and a display 55. The physical configuration of each of the controller 51, the storage 52, the communicator 53, the operation device 54, and the display 55 may be the same as those of the controller 11, the storage 12, the communicator 13, the operation device 34, and the display 35, respectively.

Programs and data to be described as being stored into the storages 12, 22, 32, 42, and 52 may be supplied thereto via the network N. Further, the respective hardware configurations of the computers are not limited to the above-mentioned examples, and various types of hardware can be applied thereto. For example, the hardware configuration may include a reader (e.g., an optical disc drive or a memory card slot) configured to read a computer-readable information storage medium, or an input/output device (e.g., a USB port) configured to input and output data to/from an external device. For example, the program and the data stored in the information storage medium may be supplied to each of the computers through intermediation of the reader or the input/output device.

2. Outline of Search System

In this embodiment, description is made of an exemplary case in which the search system 1 is applied to a travel reservation service. The travel reservation service is a service for assisting the user in reserving a travel, and for example, the user can reserve an accommodation facility, an airplane ticket, a rental car, or a bus. The search system 1 can be applied to any scene other than reservation of a travel, and can be applied to various scenes, for example, search of a product.

For example, when the user operates the user terminal 30 to access the search server 10, a top screen of the travel reservation service is displayed on the display 35. The screen described later may be displayed as a screen of an application for reserving a travel stored in the user terminal 30, or may be displayed as a screen of a web browser. Further, in this embodiment, a screen for a smartphone is given as an example, but a screen of another layout for a desktop PC or a tablet PC may be displayed, for example.

Figure 2:
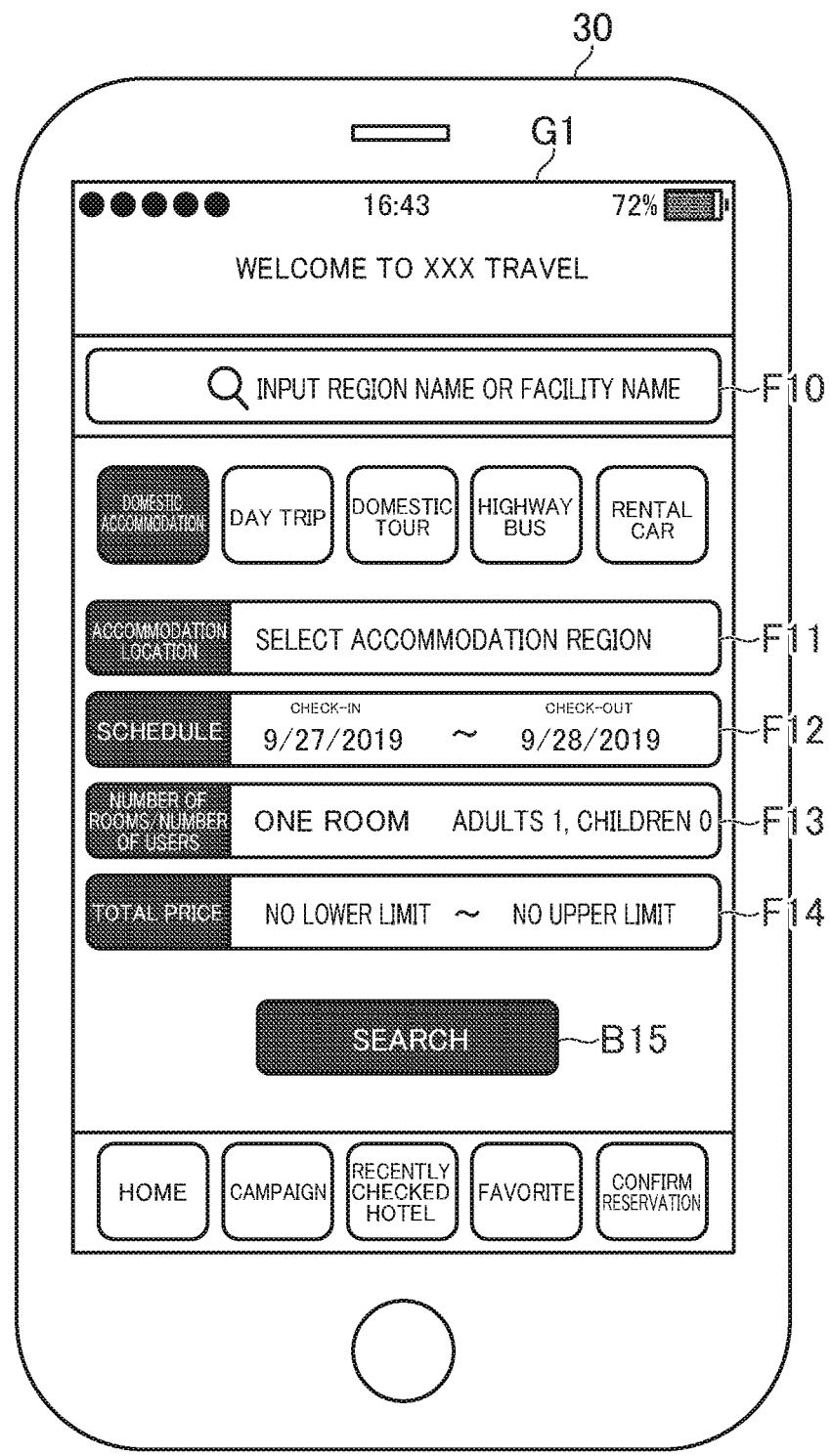
FIG. 2 is a diagram for illustrating an example of a top screen.

FIG. 2 is a diagram for illustrating an example of the top screen. As illustrated in FIG. 2, for example, input forms F10 to F14 for inputting search conditions, and a button B15 for executing a search are displayed on a top screen G1. In this embodiment, a case in which the user reserves an accommodation facility on the top screen G1 is given as an example. The search medium is not limited to a website for reserving a travel, but may be any medium, for example, a search tool.

Any character string such as a region name or a facility name is input on the input form F10 as a keyword. Any region is input on the input form F11 from an accommodation region list prepared in advance. A check-in date and a check-out date are input on the input form F12. The number of rooms to be reserved and the number of users are input on the input form F13. At least one of a lower limit value or upper limit value of an accommodation fee is input on the input form F14.

The user is not required to input search conditions on all of the input forms F10 to F14, and may input a search condition on at least one of the input forms F10 to F14. For example, when the user inputs a search condition on at least one of the input forms F10 to F14 and selects the button B15, the user terminal 30 transmits the search condition to the search server 10.

Figure 3:
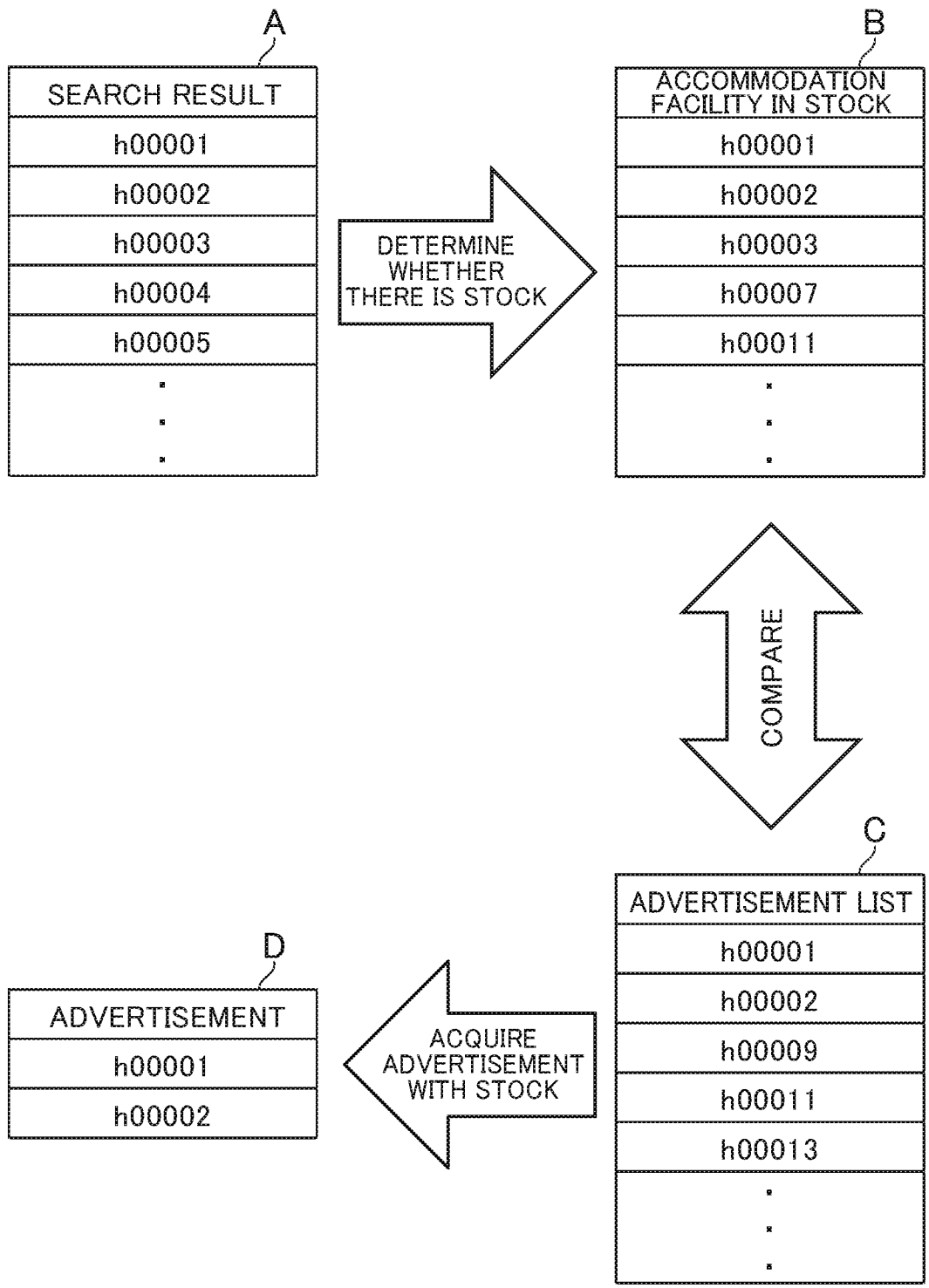
FIG. 3 is a diagram for illustrating an outline of processing after a search condition is transmitted.

FIG. 3 is a diagram for illustrating an outline of processing after a search condition is transmitted. As illustrated in FIG. 3, when the search server 10 receives a search condition, the search server 10 searches for an accommodation facility satisfying the search condition, and acquires search results A. In the example of FIG. 3, a facility ID for uniquely identifying an accommodation facility included in the search results A is indicated by a character string of "h00001", for example.

In this embodiment, description is made of a case in which the search server 10 having received the search condition executes a search by itself, but the search server 10 may request an external search engine to execute a search. Further, the search engine may execute a search to acquire the search results A in accordance with such conditions as descending order of popularity, ascending order of price, or descending order of rate.

When the search server 10 acquires the search results A, the search server 10 determines whether there is a stock (vacant room) on the date indicated by the search condition for each accommodation facility included in the search results A, and acquires an accommodation facility in stock on the date as determination results B. In the example of FIG. 3, the search result is satisfied for accommodation facilities with the facility IDs of "h00004" and "h00005". However, there is no stock on the date indicated by the search condition, and thus those facility IDs are excluded from the search results B.

When a reservation start date is set for the accommodation facility, it may be determined that there is no stock before the reservation start date even when there is a stock on the date indicated by the search condition. Further, whether there is a stock may be determined in accordance with a condition such as the date or the number of users that can be accommodated in a room, which is possessed by the accommodation facility. Further, when usage by children is set in the search condition, whether children can use the accommodation facility may be determined at the time of stock determination.

In this embodiment, not only search results but also an advertisement that depends on the search condition is displayed on the user terminal 30. The upper limit number of advertisements to be displayed on the user terminal 30 is defined, and in this embodiment, the number is set to 2. The accommodation facility can freely determine whether to display an advertisement, and can also determine a condition, for example, a bid price.

For example, the search server 10 transmits a search condition to the advertisement server 20 to request an advertisement list C. The advertisement server 20, which has received the search condition, searches for an accommodation facility satisfying the search condition, and acquires the advertisement list C. In this embodiment, the advertisement server 20 does not manage the stock of the accommodation facility, and the advertisement list may include an accommodation facility out of stock. In the example of FIG. 3, an accommodation facility with the facility ID of "h00009"

desires to display an advertisement, and the search condition of the user is satisfied. However, there is no stock (not included in determination results B) on the date indicated by the search condition. Thus, the advertisement server 20 includes a larger number of advertisements than the upper limit number in the advertisement list C in order to allow the advertisement list C to have a margin.

Figure 4:
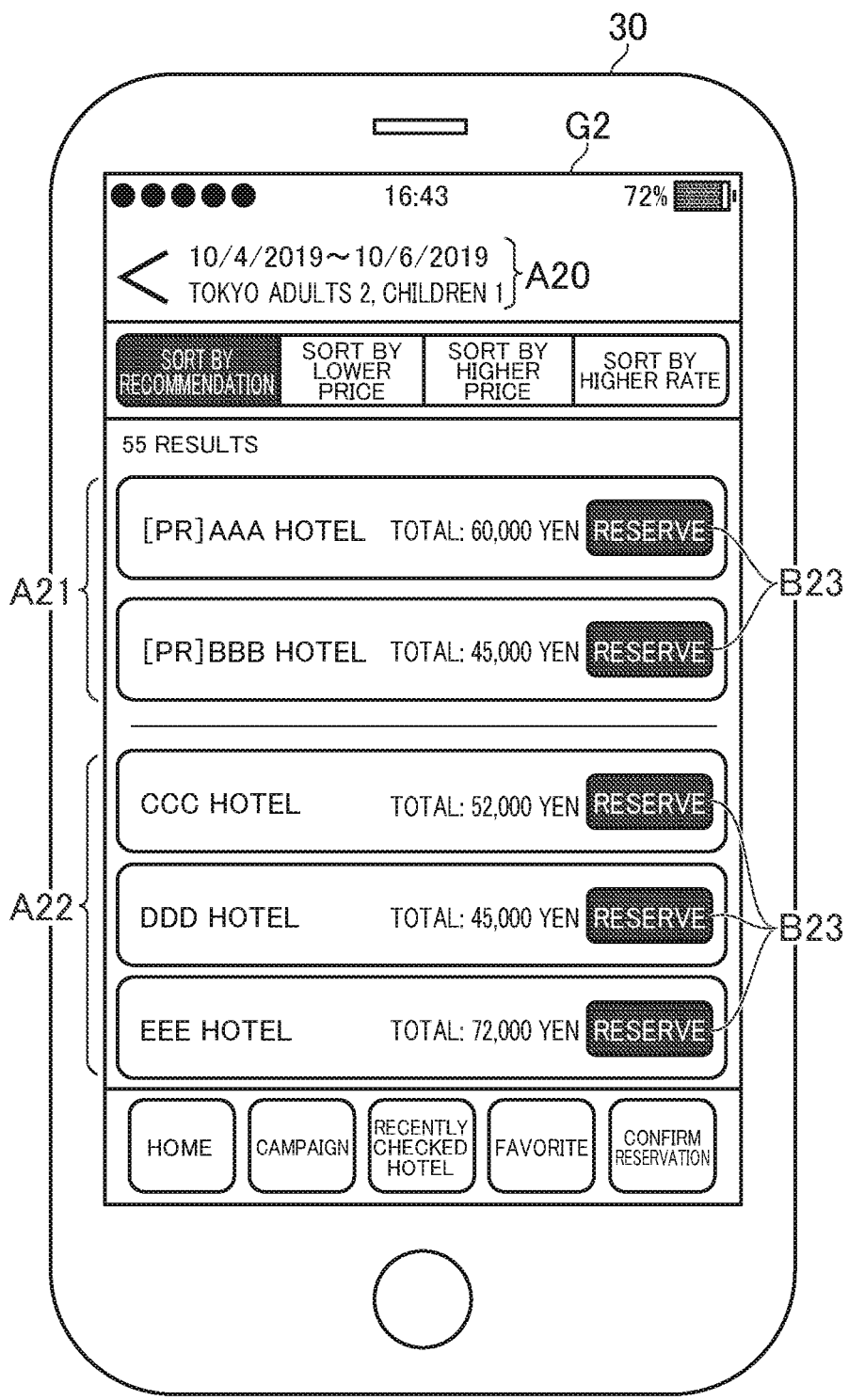
FIG. 4 is a diagram for illustrating an example of a search result screen.

The advertisement list C also includes an advertisement of an accommodation facility out of stock on the date indicated by the search condition, and thus the search server 10 compares the determination results B with the advertisement list C to identify an advertisement of an accommodation facility in stock on the date indicated by the search condition. In the example of FIG. 3, the accommodation facility with the facility ID of "h00009" in the advertisement list C has no stock (there is no determination result B) on the date indicated by the search condition, and thus this accommodation facility is excluded from the advertisement. Further, the upper limit number of advertisements is defined, and thus the search server 10 acquires the upper limit number or less of advertisements. In the example of FIG. 4, advertisements D of two accommodation facilities with the facility IDs of "h00001" and "h00002" are acquired.

As described above, in this embodiment, information on whether there is a stock is required in each of the case of acquiring the search results A and the case of acquiring the advertisements D. In this respect, when stock determination is separately executed, the stock determination is executed redundantly, resulting in increase in processing load on the search server 10. Thus, the search server 10 holds the stock determination results B at the time when the search results are acquired, and compares the determination results B with the advertisement list C, to thereby finish the stock determination all at once. When the search server 10 identifies the advertisement D, the search server 10 displays the search result screen on the user terminal 30.

FIG. 4 is a diagram for illustrating an example of the search result screen. As illustrated in FIG. 4, a display region A20 of a search result screen G2 displays the search conditions input by the user. In the example of FIG. 4, a check-in date, a check-out date, an accommodation region, the number of adults, and the number of children are specified as the search conditions, and an accommodation facility that satisfies the search conditions and has a stock on the date indicated by the search conditions is searched for.

A display region A21 of the search result screen G2 displays an upper limit number of pieces of content of the advertisements D, and a display region A22 displays all or a part of the pieces of content of the determination results B. As illustrated in FIG. 4, the advertisements are displayed more preferentially than the search results so as to easily catch attention of the user, and is displayed above the search results, for example. In FIG. 4, only the name and total price of each accommodation facility are illustrated, but other information such as a thumbnail image or an accommodation condition may be displayed.

A button B23 for proceeding to a reservation screen of the accommodation facility is displayed on the search result screen G2. The user can select the button B23 on the display region A21 to reserve an accommodation facility of the advertisement D, or select the button B23 on the display region A22 to reserve an accommodation facility of the search result A. A stock on the date indicated by the search condition is confirmed for any accommodation facility, and thus the user can select any button B23 to proceed to the reservation screen of an accommodation facility in stock on the date indicated by the search conditions.

As described above, the search server 10 reduces the processing load by executing stock determination all at once without separately executing stock determination of an accommodation facility in the search results and stock determination of an accommodation facility in the advertisement list. Now, details of this technology are described.

3. Functions to be Implemented by Search System and Other Components

Figure 5:
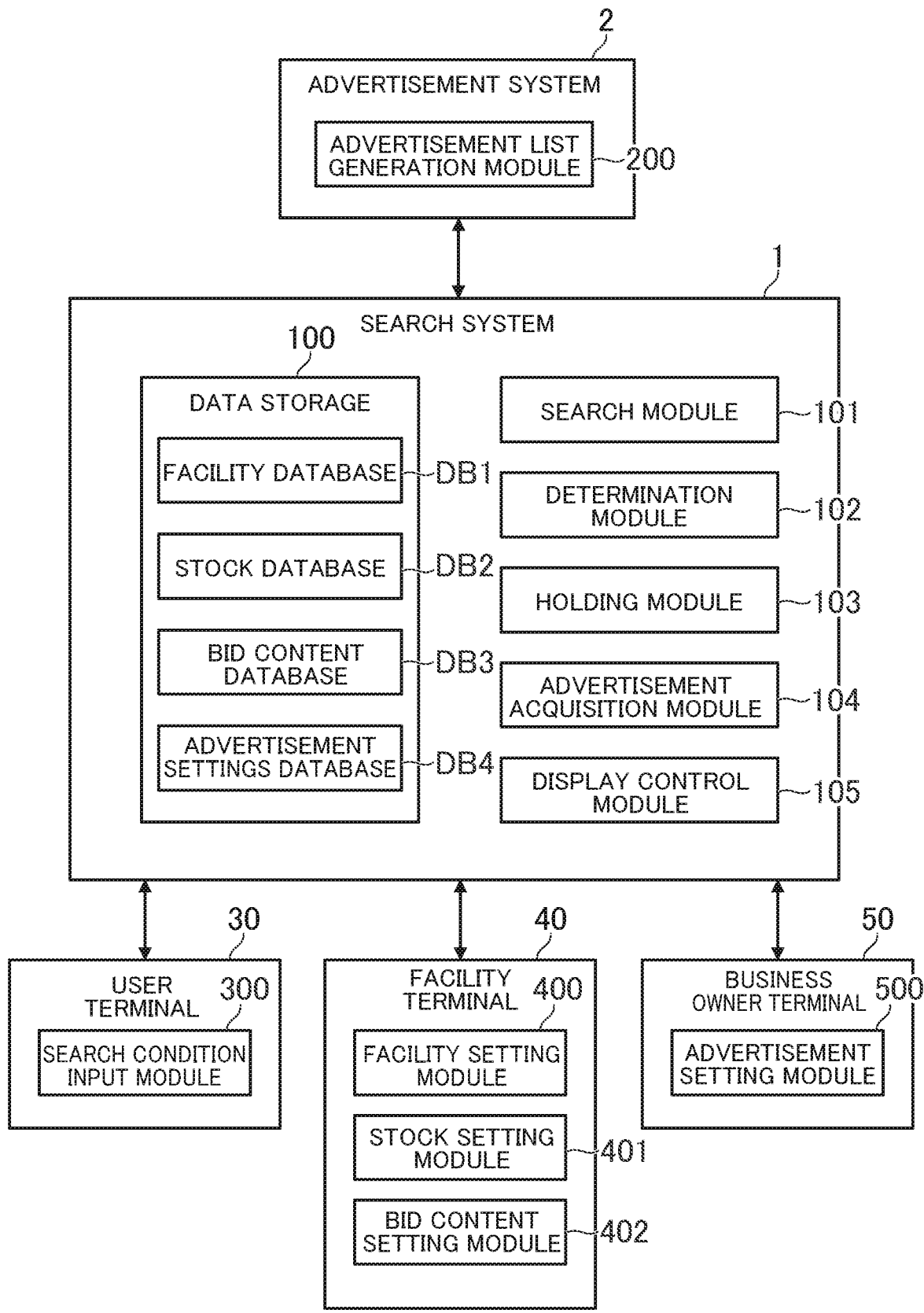
FIG. 5 is a functional block diagram for illustrating an example of functions to be implemented by the search system and other components.

FIG. 5 is a functional block diagram for illustrating an example of functions to be implemented by the search system 1 and other components. In this embodiment, description is made of functions to be implemented by each of the search system 1, the advertisement system 2, the user terminal 30, the facility terminal 40, and the business owner terminal 50.

[3-1. Functions to be Implemented by Search System]

As illustrated in FIG. 5, a data storage 100, a search module 101, a determination module 102, a holding module 103, an advertisement acquisition module 104, and a display control module 105 are implemented in the search system 1. In this embodiment, each function is implemented by the search server 10.

[Data Storage]

The data storage 100 is mainly implemented by the storage 12. The data storage 100 stores data required for performing a search or stock determination. Now, description is made of a facility database DB1, a stock database DB2, a bid content database DB3, and an advertisement settings database DB4 as examples of the data stored in the data storage 100.

FIG. 6 is a table for showing an example of storage of data in the facility database DB1. As shown in FIG. 6, the facility database DB1 is a database that stores various kinds of information on the accommodation facility. For example, the facility database DB1 stores a facility ID, facility information, and room information of the accommodation facility.

The facility information is information on the entire accommodation facility, and stores, for example, a name, address, contact information, image of a building, facilities in a site, equipment, and price range of the accommodation facility. The room information is information on each room in the accommodation facility, and stores, for example, a room ID for uniquely identifying a room, a name of the room, the maximum capacity, a type of the room, a layout, a size, whether there is a bath, whether there is a toilet, and an introduction of the room.

The facility information and room information associated with each facility ID are used as an index at the time of a search. For example, when an accommodation location is input as the search condition, an address of the facility information serves as an index. Further, for example, when the number of users is input as the search condition, the maximum capacity of the room information serves as an index. The staff member of each accommodation facility can operate the facility terminal 40 to register facility information and room information.

The information stored in the facility database DB1 is not limited to the above-mentioned example. For example, an attribute to which the accommodation facility or each room belongs may be stored among a plurality of attributes. The attribute is a category to which the accommodation facility belongs, and is, for example, the type, region, or price range of the facility. Further, for example, the attribute may be whether the facility accepts children, whether the facility accepts pets, whether the facility is accessible to anyone, or whether the facility can provide services in English. Further, for example, the facility database DB1 may store information such as the price of each room or the word of mouth of the accommodation facility. Those pieces of information can be used as an index at the time of a search.

FIG. 7 is a table for showing an example of storage of data in the stock database DB2. As shown in FIG. 7, the stock database DB2 is a database that stores stock information on each accommodation facility. For example, the stock database DB2 stores a facility ID, a room ID, a date of use, and stock information. That is, stock information for each of a plurality of dates of use is managed for each room of each accommodation facility.

The stock information is information indicating whether there is a stock. In the case of an accommodation facility, the fact that there is a vacant room corresponds to the fact that there is a stock, and the fact that there is no vacant room corresponds to the fact that there is no stock. The stock information indicates the number of remaining stocks. In the case of an accommodation facility, the number of remaining stocks is the number of vacant rooms. The fact that the stock information indicates a value equal to or larger than a threshold value means the fact that there is a stock, whereas the fact that the stock information indicates a value smaller than the threshold value means the fact that there is no stock. In this embodiment, this threshold value is set to 1, but a threshold value equal to or larger than 2 may be set, and it may be determined that there is substantially no stock when the number of stocks becomes smaller. The stock information may be information having any format, and is not limited to a numerical value. For example, the stock information may be information, for example, a flag indicating whether there is a stock.

The stock information on each accommodation facility is always kept to the latest state, and is updated in real time. For example, when the search server 10 receives a reservation of the accommodation facility, the search server 10 changes the stock information on the accommodation facility. Further, for example, the staff member of the facility operates the facility terminal 40 to access the search server 10, and changes the stock information for a reservation directly received by the accommodation facility. Further, for example, when there is another affiliated travel reservation service, the search server synchronizes stock information with that of the travel reservation service. Means for updating the stock information is not limited thereto, and other means may be used to update the stock information. For example, the facility terminal 40 may input pieces of stock information in bulk via an external management system.

In the example of FIG. 7, description has been made of a case in which there is stock information for each room of the accommodation facility. However, the stock information may indicate stocks of the entire accommodation facility. In this case, the stock information indicates the total number of stocks of all the rooms included in the accommodation facility.

FIG. 8 is a table for showing an example of storage of data in the bid content database DB3. As shown in FIG. 8, the bid content database DB3 is a database that stores bid content of an advertisement registered by the accommodation facility. For example, the bid content database DB3 stores a facility ID and an advertisement condition. The advertisement condition is a condition on an advertisement registered by the accommodation facility, and information such as a keyword, a region name, and a bid price is stored. The advertisement condition serves as an index at the time of searching for an accommodation facility to be included in the advertisement list. The bid price is a price to be paid to the business owner by the accommodation facility when an advertisement is displayed or selected.

FIG. 9 is a table for showing an example of storage of data in the advertisement settings database DB4. As shown in FIG. 9, the advertisement settings database DB4 is a database that stores settings details of an advertisement registered by a business operator. For example, the advertisement settings database DB4 stores information to be displayed on the search result screen G2, such as the upper limit number of advertisements, a schedule condition, and a bid condition. The schedule condition indicates any one of a time point at which the user has performed a search, a date of use specified by the user at the time of a search, and a date at which the user has made a reservation.

The data to be stored in the data storage 100 is not limited to the above-mentioned example. For example, the data storage 100 may store, for example, image data or layout data (user interface data) on the screen to be displayed on the user terminal 30. Further, for example, the data storage 100 may store a user database that stores information on each of a plurality of users. For example, the user database stores information such as a name, an address, sex, an age, a job, a browsing history of the screen, and a reservation history of the accommodation facility. Further, for example, the data storage 100 may store a program of a search engine.

[Search Module]

The search module 101 is mainly implemented by the controller 11. The search module 101 is configured to execute a search based on a search condition input from the user terminal 30 (example of terminal connected via network N).

The search condition is information serving as a query at the time of a search. Any condition can be input as the search condition, and the search condition is represented by, for example, a keyword (character string), a numerical value, an attribute, or a combination thereof. An "AND" condition or an "OR" condition may be specified as the search condition.

For example, the search condition includes at least one of a plurality of items, which is input on the user terminal. The item is a type of component (information included in search condition) of the search condition. In the example of the input forms F11 to F14 of FIG. 2, four items, namely, "accommodation location", "schedule", "number of rooms/number of users", and "total price" are prepared, and the user inputs a condition of at least one item. A keyword to be input on the input form F10 is also an example of the search condition.

In this embodiment, the accommodation facility to be searched for by the search module 101 is an example of the item. Thus, the description of "accommodation facility" in this embodiment can be replaced with "item". The item is information (data item) to be searched for, and may be, for example, a service to be reserved by the user, or a product to be purchased by the user. The item may also be called "data item", and can also be referred to as an individual record in the database. An individual room in the accommodation facility may correspond to the item.

The search module 101 is configured to execute a search based on the search condition transmitted by the user terminal 30 to the search server 10. The search module 101 executes a search with the search condition serving as a query and facility information and room information on each accommodation facility stored in the facility database DB1 serving as indices.

In this embodiment, a case of executing a search by a publicly known search engine used in, for example, a search for a webpage is given as an example. For example, the search module 101 inputs a search condition into the search engine, and acquires search results output from the search engine. In this embodiment, it is assumed that the search engine is stored in the data storage 100. However, the search engine of an external computer may be used. The search engine can access the facility database DB1, and calculates a score indicating the degree of match with a search condition for each accommodation facility. The search engine outputs search results based on the score of each accommodation facility.

The search results are a list of accommodation facilities that depend on the search condition. The accommodation facility that depends on the search condition can also be said to be an accommodation facility that satisfies the search condition, an accommodation facility that matches the search condition, or an accommodation facility that hits in the search. The search results include at least one accommodation facility that depends on the search condition, and there may be any number of accommodation facilities. The upper limit number may be defined for the number of accommodation facilities to be included in the search results, or the upper limit number may not particularly be defined. When there is no accommodation facility that depends on the search condition, the number of search results may be 0.

For example, the search engine includes all the accommodation facilities having scores equal to or larger than a threshold value in the search results. Further, for example, the search engine selects and includes a predetermined number of accommodation facilities in the search results in descending order of score. The search module 101 acquires the search results output from the search engine. In this embodiment, the search engine does not determine whether there is a stock, and thus the search results output from the search engine may include an accommodation facility out of stock on the date indicated by the search condition. The search engine may determine whether there is a stock on the date indicated by the search condition. That is, the search engine may have a function corresponding to the determination module 102 described later.

A publicly known search algorithm can be used for the search itself, and is not limited to the method using a search engine. For example, the search module 101 may execute a search not by using a search engine used in a search of, for example, the Internet, but by using a unique search algorithm. This search algorithm may have any details, and for example, an exact match or partial match with a keyword may be used, or a value that is the same as or similar to a numerical value included in the search condition may be searched for.

[Determination Module]

The determination module 102 is mainly implemented by the controller 11. The determination module 102 is configured to use stock information on each of the plurality of accommodation facilities included in the search results obtained by the search module 101 to determine whether there is a stock of each accommodation facility. The stock information on each accommodation facility is stored in the stock database DB2, and thus the determination module 102 determines whether there is a stock of each accommodation facility included in the search results based on the stock database DB2.

In this embodiment, description is made of a case in which the determination module 102 determines whether there is a stock on the date indicated by the search condition for all the accommodation facilities included in the search results. However, the determination module 102 may determine whether there is a stock on the date indicated by the search condition only for a part of the accommodation facilities. For example, the determination module 102 determines whether stock information on an accommodation facility on the date indicated by the search condition indicates a value equal to or larger than a threshold value. When the stock information indicates a value equal to or larger than the threshold value, the determination module 102 determines that there is a stock, whereas when the stock information indicates a value smaller than the threshold value, the determination module 102 determines that there is no stock.

[Holding Module]

The holding module 103 is mainly implemented by the controller 11. The holding module 103 is configured to hold results of determination by the determination module 102. The results of determination by the determination module 102 are information allowing identification of whether there is a stock of each accommodation facility on the date indicated by the search condition. The term "hold" refers to recording information into the data storage 100 or another information storage medium. In other words, the term "hold" refers to avoiding immediately deleting the results of determination by the determination module 102 and keeping the results so that the results can be referred to afterwards. The held determination results can be referred to at any timing, and in this embodiment, is referred to by the advertisement acquisition module 104.

As described with reference to FIG. 3, in this embodiment, the search results include the facility ID of an accommodation facility that depends on the search condition. The search results may store not only the facility ID but also the room ID. The holding module 103 deletes, from among the search results, a facility ID of an accommodation facility determined not to have a stock on the date indicated by the search condition, and keeps a facility ID of an accommodation facility determined to have a stock on the date indicated by the search condition. The accommodation facility for which the facility ID is kept means the fact that the accommodation facility has a stock on the date indicated by the search condition. The holding module 103 holds the determination results by recording, into the data storage 100, only the facility ID of an accommodation facility determined to have a stock on the date indicated by the search condition from among the search results.

The method of holding the results of determination by the determination module 102 is not limited to the above-mentioned example. For example, the holding module 103 may hold a stock flag indicating whether there is a stock on the date indicated by the search condition in association with the facility ID of each accommodation facility included in the search results. Alternatively, for example, the holding module 103 may hold stock information on each accommodation facility included in the search results as the determination results as it is. The held determination results are deleted at any timing, and are deleted when the search result screen G2 is displayed, for example.

[Advertisement Acquisition Module]

The advertisement acquisition module 104 is mainly implemented by the controller 11. The advertisement acquisition module 104 is configured to acquire at least one advertisement of an accommodation facility that satisfies the search condition and has a stock, based on the results of determination by the determination module 102. As described above, in this embodiment, stock information is managed for each date, and thus an accommodation facility in stock means an accommodation facility in stock on the date indicated by the search condition. That is, even when there is a stock on another date, an accommodation facility out of stock on the date indicated by the search condition does not correspond to the accommodation facility in stock.

The advertisement may be an advertisement of an accommodation facility satisfying all the search conditions, or may be an advertisement of an accommodation facility satisfying a part of the search conditions. In other words, the search condition to be used for acquiring search results and the search condition to be used for searching for an advertisement may be the same or different from each other. For example, information, for example, a user attribute not included in the search condition, may be used for searching for an advertisement.

The phrase "acquiring advertisement" refers to acquiring information required for displaying an advertisement. In other words, the phrase "acquiring advertisement" refers to identifying an advertisement to be displayed. For example, acquiring an advertisement corresponds to acquiring the facility ID of an accommodation facility indicated by the advertisement, acquiring image data on the advertisement, acquiring a link to a page of the accommodation facility indicated by the advertisement, and acquiring facility information or room information on the accommodation facility.

The advertisement acquisition module 104 uses the results of determination by the determination module 102 to identify at least one advertisement of an accommodation facility in stock on the date indicated by the search condition from among accommodation facilities satisfying the search condition. For example, the advertisement acquisition module 104 acquires an advertisement list that depends on the search condition, and acquires at least one advertisement of an item in stock on the date indicated by the search condition based on the determination results held by the holding module 103 and the advertisement list.

As described with reference to FIG. 3, the advertisement list is a list of advertisements of accommodation facilities satisfying the search condition. As described above, stock determination is not executed at the time of generating an advertisement list, and thus the advertisement list may include an advertisement of an accommodation facility out of stock on the date indicated by the search condition. For example, the advertisement list may include not only the facility ID but also the room ID, the link to a page of the accommodation facility indicated by the advertisement, and image data on the advertisement, for example.

The advertisement acquisition module 104 compares the determination results held by the holding module 103 with the advertisement list to acquire an advertisement. For example, the advertisement acquisition module 104 determines whether an accommodation facility included in the held determination results is included in the advertisement list, and acquires an advertisement of the accommodation facility included in the advertisement list. Further, for example, the advertisement acquisition module 104 acquires an advertisement of the accommodation facility in stock on the date indicated by the search condition from the advertisement list based on the held determination results.

In this embodiment, the advertisement list is generated by the external advertisement system 2, and thus the advertisement acquisition module 104 requests the external advertisement system 2 for an advertisement list, and acquires the advertisement list generated by the advertisement system 2. The advertisement acquisition module 104 acquires an advertisement of an accommodation facility in stock on the date indicated by the search condition from the advertisement list acquired from the advertisement system 2. The advertisement acquisition module 104 may acquire only one advertisement, or may acquire a plurality of advertisements. When there is no advertisement of an accommodation facility satisfying the search condition, or when there is no advertisement of an accommodation facility in stock on the date indicated by the search condition, an advertisement may not be acquired.

In this embodiment, the upper limit number of displayable advertisements is defined in advance for the search result screen G2. The advertisement acquisition module 104 acquires an advertisement list including a larger number of advertisements than the upper limit number, and then acquires the upper limit number or less of advertisements based on the advertisement list. The upper limit number may be a fixed value or a variable value. Further, the upper limit number may be common to all the users, or may be defined depending on the user. The advertisement acquisition module 104 is not required to acquire just the upper limit number of advertisements, and is only required to acquire one to the maximum number of advertisements.

[Display Control Module]

The display control module 105 is mainly implemented by the controller 11. The display control module 105 is configured to display, on the search result screen G2, at least one accommodation facility in stock and at least one advertisement from among the search results. In this embodiment, the display control module 105 is implemented by the search server 10, and thus the display control module 105 generates data to be displayed on the search result screen G2 based on the results of determination by the determination module 102 and the results of acquisition by the advertisement acquisition module 104, and transmits the data to the user terminal 30.

The data to be displayed is only required to be data for displaying the search result screen G2, and the data may be data indicating the entire search result screen G2, or may be data indicating a part of the search result screen G2. For example, when the search result screen G2 is displayed by a web browser, the data to be displayed is HTML data. Further, for example, when each screen is displayed by using a program (e.g., travel reservation application) of the user terminal 30, the data to be displayed is text information or an image to be embedded into a frame of the screen.

[3-2. Functions to be Implemented in Advertisement System]

As illustrated in FIG. 5, in the advertisement system 2, an advertisement list generation module 200 is implemented. In this embodiment, the advertisement list generation module 200 is implemented in the advertisement server 20. The advertisement server 20 may store a database of content equivalent to the facility database DB1, the bid content database DB3, and the advertisement settings database DB4, or may not store those databases but may be able to access those databases stored in the search server 10. The advertisement list is generated based on content of at least one database among those databases.

The advertisement list generation module 200 is mainly implemented by the controller 21. The advertisement list generation module 200 is configured to generate an advertisement list of accommodation facilities satisfying the search condition. All the accommodation facilities may be advertised, but in this embodiment, whether each accommodation facility is to place an advertisement can be freely specified. Thus, the advertisement list generation module 200 generates an advertisement list of accommodation facilities satisfying the search condition and placing an advertisement.

In this embodiment, the advertisement list generation module 200 generates an advertisement list including a larger number of advertisements than the upper limit number of advertisements on the search result screen G2. The upper limit number (number larger than upper limit number of advertisements on search result screen G2) may be set for advertisements included in the advertisement list, or the upper limit number may not particularly be set. Further, when the number of accommodation facilities satisfying the search condition is small, an advertisement list including a smaller number of advertisements than the upper limit number of advertisements on the search result screen G2 may be generated.

As described above, the search condition for acquiring search results and the search condition for generating an advertisement list may be different from each other. For example, the advertisement list generation module 200 may generate an advertisement list based not only on the search condition input by the user but also on the attribute of the user. Further, for example, the advertisement list generation module 200 may generate an advertisement list based on an advertisement condition registered by each accommodation facility. For example, the advertisement list generation module 200 may generate an advertisement list matching a keyword or region name included in the advertisement condition, or may generate an advertisement list based on a score weighted depending on the bid price.

A priority may be assigned to an advertisement included in the advertisement list. For example, the advertisement list generation module 200 may generate an advertisement list so that the priority becomes higher as the bid price becomes higher. Further, for example, the advertisement list generation module 200 may set a higher priority as the advertisement matches more keywords or region names included in the advertisement conditions. As the priority becomes higher, the advertisement is more likely to be selected by the advertisement acquisition module 104.

[3-3. Functions to be Implemented by User Terminal]

As illustrated in FIG. 5, in the user terminal 30, a search condition input module 300 is implemented. The search condition input module 300 is mainly implemented by the controller 31. The search condition input module 300 is configured to receive input of a search condition by the user based on a signal detected by the operation device 34, and transmit the search condition to the search server 10. For example, when the user selects the button B15 of the top screen G1, the search condition input module 300 transmits, to the search server 10, search conditions including information input to each of the input forms F10 to F14.

[3-4. Functions to be Implemented by Facility Terminal]

As illustrated in FIG. 5, in the facility terminal 40, a facility setting module 400, a stock setting module 401, and a bid content setting module 402 are implemented.

[Facility Setting Module]

The facility setting module 400 is mainly implemented by the controller 41. The facility setting module 400 is configured to register facility information and room information in the facility database DB1 based on the signal detected by the operation device 44. For example, the facility setting module 400 transmits, to the search server 10, the facility information and room information input by the staff member of the accommodation facility, and registers those pieces of information in the facility database DB1 in association with the facility ID of the accommodation facility.

[Stock Setting Module]

The stock setting module 401 is mainly implemented by the controller 41. The stock setting module 401 is configured to update stock information of the stock database DB2 based on the signal detected by the operation device 44. For example, when the staff member of an accommodation facility performs an operation of changing the stock information, the stock setting module 401 transmits this information to the search server 10, and changes the stock information associated with the facility ID of the accommodation facility. The change operation may be an operation of instructing to increase or decrease stocks, or may be an operation of inputting the latest number of stocks.

[Bid Content Setting Module]

The bid content setting module 402 is mainly implemented by the controller 41. The bid content setting module 402 is configured to set a bid condition in the bid content database DB3 based on the signal detected by the operation device 44. For example, the bid content setting module 402 transmits, to the search server 10, an advertisement condition input by the staff member of the accommodation facility, and registers the advertisement condition in the bid content database DB3.

[3-5. Functions to be Implemented by Business Owner Terminal]

As illustrated in FIG. 5, in the business owner terminal 50, an advertisement setting module 500 is implemented. The advertisement setting module 500 is mainly implemented by the controller 51. The advertisement setting module 500 is configured to register advertisement settings details in the advertisement settings database DB4 based on the signal detected by the operation device 54. For example, the advertisement setting module 500 transmits, to the search server 10, the upper limit number of advertisements, the schedule condition, the bid condition, and other conditions, which are input by the business owner, and registers those pieces of information in the advertisement settings database DB4.

4. Processing to be Executed in Search System and Other Components

Figure 10:
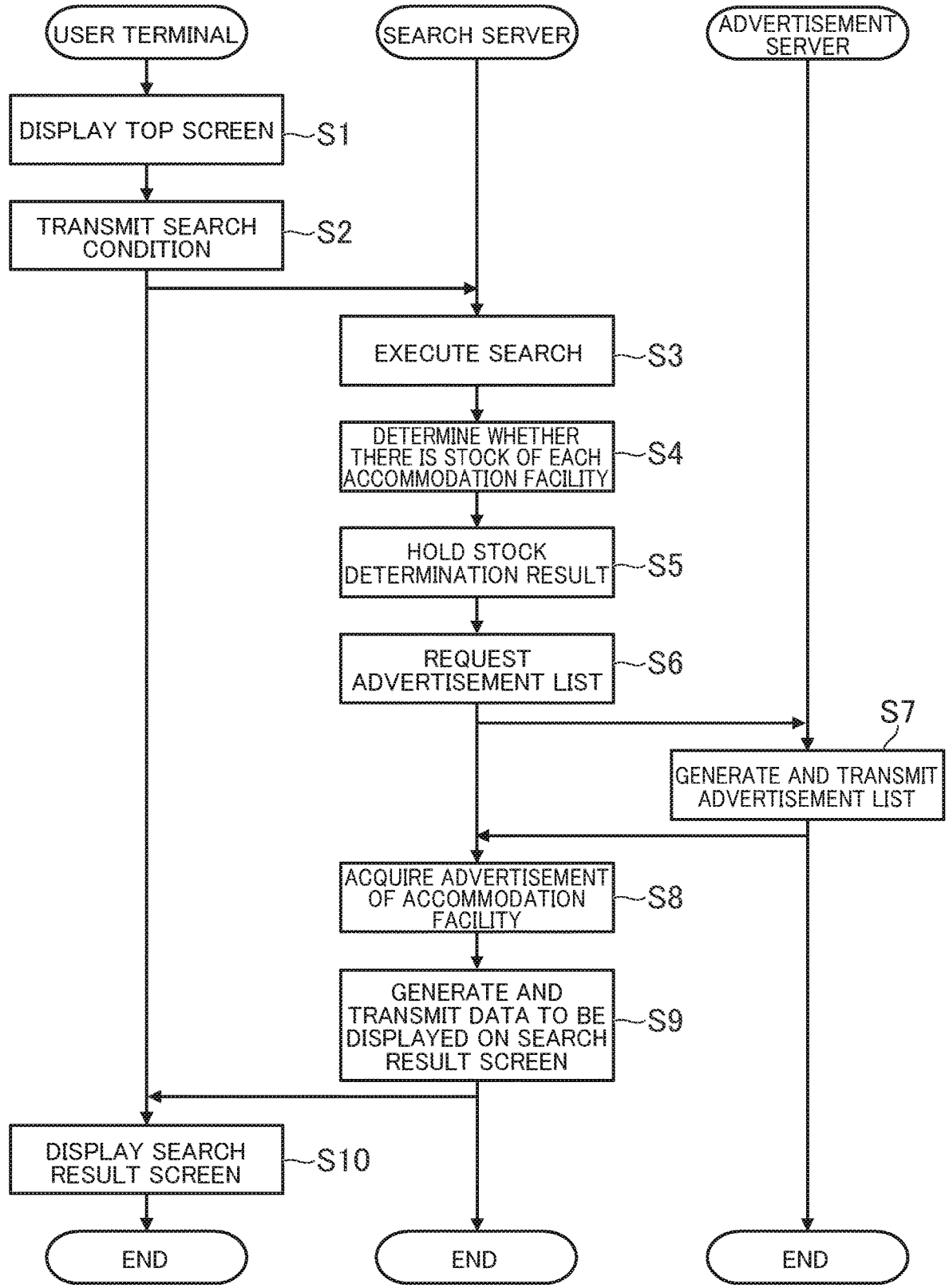
FIG. 10 is a flow chart for illustrating an example of processing to be executed in the search system and other components.

FIG. 10 is a flow chart for illustrating an example of processing to be executed in the search system 1 and other components. The processing illustrated in FIG. 10 is executed by the controllers 11, 21, and 31 operating in accordance with programs stored in the storages 12, 22, and 32, respectively. The processing described below is an example of processing to be executed by the functional blocks illustrated in FIG. 5. In FIG. 10, description is made of a case in which processing of generating an advertisement list in Step S6 and Step S7 is executed after search processing in Step S3 to Step S5 is executed. However, the search processing and the processing of generating an advertisement list can be executed in parallel.

As illustrated in FIG. 10, the user terminal 30 first displays the top screen G1 on the display 35 (Step S1). For example, when a URL of the top screen G1 is selected or when a travel reservation application is activated, the processing of Step S1 is executed. The user terminal 30 receives data required for displaying the top screen G1 from the search server 10, and displays the data on the top screen G1.

The user terminal 30 transmits, to the search server 10, the search condition input by the user based on the signal detected by the operation device 34 (Step S2). In Step S2, the user terminal 30 displays the search condition input by the user on each of the input forms F10 to F14. When the button B15 is selected, the user terminal 30 transmits, to the search server 10, the search condition input on each of the input forms F10 to F14.

When the search server 10 receives the search condition, the search server 10 searches the facility database DB1 (Step S3). In Step S3, the search server 10 executes a search with the search condition serving as a query and the facility information and room information stored in the facility database DB1 serving as indices, to thereby acquire search results.

The search server 10 determines whether there is a stock in each accommodation facility included in the search results acquired in Step S3, based on the stock database DB2 (Step S4). In Step S4, the search server 10 refers to the stock database DB2 to acquire stock information on the date indicated by the search condition for each accommodation facility included in the search results. The search server 10 determines that there is a stock in an accommodation facility with the stock information indicating a value equal to or larger than 1, or determines that there is no stock in an accommodation facility with the stock information indicating 0.

The search server 10 holds the stock determination results obtained in Step S4 (Step S5). In Step S5, the search server 10 records the determination results obtained in Step S4 into the storage 12 for each accommodation facility included in the search results.

The search server 10 transmits the search condition to the advertisement system 2 to request the advertisement system 2 for an advertisement list (Step S6). The advertisement list may be requested by transmitting a predetermined format of data. It is assumed that the request for an advertisement list includes the search condition input by the user. The request for an advertisement list may include information on the upper limit number of advertisements on the search result screen G2, for example.

When the advertisement server 20 receives the request, the advertisement server 20 generates an advertisement list, and transmits the advertisement list to the search server 10 (Step S7). In Step S7, the advertisement server 20 searches for an advertisement with the search condition serving as a query and the advertisement condition serving as an index. The advertisement may be searched for based on the facility database DB1 and the bid content database DB3, or may be searched for based on a facility database prepared for advertisement. The advertisement server 20 selects a predetermined number of advertisements in descending order of bid price from among advertisements included in the search results, to thereby generate an advertisement list. As described above, it is assumed that the predetermined number of advertisements is larger than the upper limit number of advertisements on the search result screen G2.

When the search server 10 receives the advertisement list, the search server 10 identifies an accommodation facility in stock on the date indicated by the search condition from the advertisement list based on the determination results held in Step S5, and acquires an advertisement of the accommodation facility (Step S8). In Step S8, the search server 10 identifies an accommodation facility determined to have a stock in Step S4 from among accommodation facilities indicated by advertisements included in the advertisement list, and acquires an advertisement of the accommodation facility.

The search server 10 generates data to be displayed on the search result screen G2, which includes the search results in Step S4 and the advertisement acquired in Step S8, and transmits the data to the user terminal 30 (Step S9). In Step S9, the search server 10 arranges the search results obtained in Step S4 in the display region A22, and arranges the advertisement acquired in Step S8 in the display region A21, to thereby generate the data to be displayed on the search result screen G2.

When the user terminal 30 receives the display data, the user terminal 30 displays the search result screen G2 on the display 35 (Step S10), and finishes the processing. After that, when the user selects button B23, the screen proceeds to a screen for reserving an accommodation facility. When the user performs an operation of returning to the top screen G1, the processing is executed again from Step S1, and the processing is executed again from Step S2 when the user inputs a search condition again.

According to the search system described above, the results of determination of a stock executed at the time of searching for an accommodation facility is used to acquire an advertisement of an accommodation facility in stock on the date indicated by the search condition to display the search result screen G2, and finish determination all at once without redundantly executing stock determination, to thereby be able to alleviate a processing load of stock determination on the search server 10. Further, the stock determination is finished all at once, to thereby be able to immediately identify an advertisement of an accommodation facility in stock on the date indicated by the search condition. As a result, it is possible to reduce a period of time required for displaying the search result screen G2, to thereby speed up the processing of displaying the search result screen G2. Further, when the advertisement server 20 determines whether there is a stock, the advertisement server 20 is also required to manage the stock database DB2. However, the advertisement server 20 is not required to determine whether there is a stock on the date indicated by the search condition, and is not required to manage the stock database DB2, and thus it is possible to reduce the amount of memory consumption by the advertisement server 20. Further, it is confirmed that the search results and advertisement on the search result screen G2 both have a stock, and thus increase of usage in the accommodation facility being an advertiser is expected. From the viewpoint of the user as well, it is possible to reserve an accommodation facility without redundantly executing a search.

Further, the search system 1 holds the results of determination of a stock executed at the time of searching for an accommodation facility, and acquires an advertisement of an accommodation facility in stock on the date indicated by the search condition based on the held determination results and the advertisement list, to thereby be able to identify an advertisement of an accommodation facility in stock on the date indicated by the search condition through simple processing of comparing the determination results with the advertisement list.

Further, the search system 1 requests the external advertisement system 2 for an advertisement list, and acquires the advertisement list from the advertisement system 2, to thereby be able to alleviate the processing load on the search server 10 because the search server 10 is not required to execute the processing of generating an advertisement list.

Further, the search system 1 acquires the upper limit number or less of advertisements from the advertisement list including a larger number of advertisements than the upper limit number of advertisements that can be displayed on the search result screen G2 in advance, to thereby be able to prevent the number of advertisements displayed on the search result screen G2 from being smaller than the upper limit number. Specifically, when the number of advertisements included in the advertisement list is the same as the upper limit number, and there is no stock of one or more of advertisements, the number of advertisements to be displayed on the search result screen G2 becomes smaller than the upper limit number. However, an advertisement list including a larger number of advertisements than the upper limit number is generated as in this embodiment, to thereby be able to increase the probability of displaying the upper limit number of advertisements.

5. Modification Examples

The present invention is not limited to the embodiment described above, and can be modified suitably without departing from the spirit of the present invention.

(1) For example, when the advertisement server 20 has consumed a substantial period of time for the processing of generating an advertisement list, the search result screen G2 may not be smoothly displayed on the user terminal 30. Thus, when the search server 10 has not acquired an advertisement list by a predetermined time limit, the search result screen G2 that does not include an advertisement may be displayed on the user terminal 30.

When at least one advertisement has not been acquired by the predetermined time limit, the display control module 105 in this modification example displays a search result screen that does not include at least one advertisement. Anytime limit may be set as the predetermined time limit, and for example, the time limit may be a predetermined period after reception of a search condition, or may be a predetermined period after the request for an advertisement list. The length of the predetermined period may be any length, and for example, from about one second to about ten seconds, or a longer period of time may be set.

The display control module 105 executes time measurement processing by using, for example, a real-time clock, and determines whether the predetermined time limit has arrived. When an advertisement has been acquired by the predetermined time limit, the display control module 105 displays the search result screen G2 including the advertisement on the user terminal 30. On the contrary, when an advertisement has not been acquired by the predetermined time limit, the display control module 105 displays the search result screen G2 that does not include an advertisement on the user terminal 30. That is, the display control module 105 displays, on the user terminal 30, the search result screen G2 that does not include an advertisement, without waiting for completion of acquisition of an advertisement.

According to Modification Example (1), when an advertisement has not been acquired by the predetermined time limit, the search result screen G2 that does not include an advertisement is displayed on the user terminal 30, and thus it is possible to reduce a period of time required for displaying the search result screen G2, to thereby speed up the processing of displaying the search result screen G2. Further, when the predetermined time limit has arrived, the search server 10 does not display the search result screen G2 to acquire an advertisement, and thus it is possible to alleviate a processing load on the search server 10. Further, when the processing of causing the advertisement server 20 to acquire an advertisement is interrupted, it is also possible to alleviate a processing load on the advertisement server 20.

(2) Further, for example, even in a case where the search server 10 tries to acquire an advertisement of an accommodation facility in stock, when the user has not input a date of use, it is not possible to identify for which point in time presence/absence of a stock is to be determined. In this case, the search server 10 may determine whether there is a stock on the date of use input by the user most recently.

The date of use is an example of a condition of a predetermined item. Thus, the description of "date of use" in this modification example can be replaced with the condition of the predetermined item. The predetermined item is not limited to the date of use, and may be any item. The predetermined item may be an item determined to be an important item among a plurality of items that can be specified as the search condition, and may be, for example, the number of users or a region name.

The data storage 100 in this modification example stores a search condition input by the user at the time of a past search. The data storage 100 may store only the input details of a predetermined item, or may store all the search conditions. Further, the data storage 100 may store all the search conditions input by the user in the past, or may store only the most recent search condition (search condition input immediately before currently input search condition). In other cases, for example, the data storage 100 may store search conditions input in the previous several months.

When a condition of a predetermined item is not input from the user terminal 30, the advertisement acquisition module 104 acquires at least one advertisement of an accommodation facility that satisfies a condition of a predetermined item input from the user terminal 30 at the time of the past search and has a stock. In this modification example, the condition of the predetermined item is a date of use, and thus when the date of use is not input from the user terminal 30, the advertisement acquisition module 104 acquires at least one advertisement of an accommodation facility in stock on the date input from the user terminal at the time of the past search.

For example, similarly to the processing described in the embodiment, the search module 101 acquires search results based on the search condition that does not include the date of use. The determination module 102 acquires the date of use input by the user at the time of the past search, and determines whether there is a stock on the date of use based on stock information on the date of use of an accommodation facility included in the search results. The advertisement acquisition module 104 acquires at least one advertisement based on the determination results. The processing itself of acquiring an advertisement based on the results of determination by the determination module 102 is as described in the embodiment.

According to Modification Example (2), when a condition of a predetermined item is not input from the user terminal 30, it is possible to present an advertisement beneficial to the user by acquiring an advertisement based on a condition of a predetermined item input from the user terminal 30 at the time of the past search.

Further, the date of use input from the user terminal 30 at the time of the past search is also likely to be used by the user in the current search, and thus it is possible to present a more valuable advertisement by acquiring an advertisement based on such a date of use.

(3) Further, for example, in Modification Example (2), in a case where the user has finished reservation of an accommodation facility on the date of use input in the past, even when an advertisement of an accommodation facility in stock on the date of use is placed, the user is less likely to select the advertisement, and hence the effect of the advertisement is low. Thus, in this case, an accommodation facility in stock at any date may be searched for and an advertisement may be displayed without particularly specifying the date of use.

The data storage 100 in this modification example stores a reservation history of the user. For example, every time the search server 10 receives a reservation of an accommodation facility made by the user, the search server 10 records details of the reservation into the data storage 100 in association with the user ID of the user. The details of reservation include information such as the facility ID, room ID, date of use, and number of users of the accommodation facility reserved by the user. Further, the details of reservation may include a search condition input by the user at the time of the search.

When reservation for the date of use input from the user terminal 30 is complete, the advertisement acquisition module 104 in this modification example does not use the date of use, and acquires at least one advertisement of an item that satisfies the search condition and has a stock. When the date of use is not input from the user terminal 30, the advertisement acquisition module 104 uses the reservation history of the user to determine whether reservation is complete on the date of use input from the user terminal 30 at the time of the past search.

When the reservation is determined not to be complete, the advertisement acquisition module 104 acquires an advertisement based on the date of use input from the user terminal 30 at the time of the past search as in Modification Example (2). On the contrary, when the reservation is determined to be complete, the advertisement acquisition module 104 acquires an advertisement without using the date of use input from the user terminal 30 at the time of the past search. In this case, the determination module 102 may not perform stock determination, or may perform stock determination for a date determined in advance. When the determination module 102 does not perform stock determination, search results and an advertisement are displayed without particularly determining whether there is a stock.

According to Modification Example (3), when reservation of an accommodation facility is complete for the date of use input by the user in the past, it is possible to present a valuable advertisement by acquiring an advertisement without using the date of use.

(4) Further, for example, the above-mentioned modification examples may be combined with each other.

Further, for example, in the embodiment, description has been made of screen transition in a case where a search condition is input from the top screen G1 serving as the top page of the travel reservation service. However, the screen of another page may transition in a similar manner. For example, the search server 10 may provide a sightseeing page indicating a sightseeing guidance for each area, and cause the screen to transition in a similar manner when the user has viewed facility information from the sightseeing page. That is, when the user has viewed facility information from the sightseeing page, stock determination that depends on the date of use and generation of an advertisement list may be executed to display an advertisement on the page of facility information. Further, for example, the screen may transition in a similar manner when a search condition is input from an external search engine and facility information is viewed via the search results obtained by the search engine. That is, when facility information is viewed via the search results obtained by the external search engine, stock determination that depends on the date of use indicated by the search condition and generation of an advertisement list may be executed to display an advertisement on the page of facility information.

Further, for example, the processing of the advertisement acquisition module 104 acquiring an advertisement based on the results of determination by the determination module 102 is not limited to the above-mentioned example. The advertisement acquisition module 104 may identify, of the search results, at least one item specified as an advertisement from among at least one accommodation facility in stock on the date indicated by the search condition, and acquire an advertisement of the at least one identified accommodation facility. That is, the advertisement acquisition module 104 may use the bid content database DB3 to identify, an accommodation facility for which an advertisement is to be placed, from among accommodation facilities in stock on the date indicated by the search condition within the search results, and acquire an advertisement of the accommodation facility. In this case, it is possible to acquire an advertisement of an accommodation facility in stock on the date indicated by the search condition without acquiring an advertisement list.

Further, for example, the search system 1 may execute both of acquisition of search results and generation of an advertisement list. Further, for example, the upper limit number of advertisements may not be defined for the search result screen G2.

Further, for example, description has been given of a case in which the search system 1 is applied to the travel reservation service. However, the search system 1 can be applied to any case of executing a search. The search system 1 may be applied to a service that does not have the concept of stock for each date, and for example, the search system 1 may be applied to an electronic commerce transaction. In this case, the search system 1 searches for a product and determines whether there is a stock based on the search condition input by the user. The search system 1 may acquire at least one product that satisfies the search condition and has a stock based on the stock determination results, and display the product together with the search results. In other cases, for example, the search system 1 can be applied to various kinds of services having a concept of stock, such as restaurant reservation, ticket purchase, event reservation, or application for a seminar.

Further, for example, the functions may be distributed among a plurality of computers. Further, for example, data described as being stored in the data storage 100 may be stored in a database server different from the search server 10, or may be stored in a database server outside of the search system 1.

The invention claimed is:

1. A search system, which is connected to a terminal via a network, the search system comprising at least one processor configured to:
   search a facility database, configured to store information related to information of each search facility, based on a search condition input from the terminal, and obtain search results based on a match between the search condition and each facility;
   obtain a search list indicating the search results;
   determine, based on searching a stock database, configured to store stock information related to a stock of each facility, for each of a plurality of items included in the search results, whether there is a stock of each item;
   obtain an in-stock list indicating which of the plurality of items included in the search results are in stock and have availability, based on the search list and the stock information for each of the plurality of items included in the search results;

acquire a plurality of advertisements, each of which is associated with a bid price and corresponds to an item that satisfies the search condition, has a stock and has availability, by comparing the in-stock list with an advertisement list, wherein the plurality of advertisements comprises a larger number of advertisements than an upper limit number associated with a search result screen;

assign a priority to each of the plurality of advertisements based on the bid price associated with each of the plurality of advertisements;

select the upper limit number or less of the plurality of advertisements based on the priority associated with each advertisement; and display, on the search result screen, at least one item indicated in the in-stock list and the selected advertisements.

2. The search system according to claim 1, wherein the at least one processor is configured to hold the results of determination, acquire the advertisement list based on the search condition, and acquire the plurality of advertisements based on the held results of determination and the advertisement list.

3. The search system according to claim 2, wherein the search system is connected to an advertisement system via a network, and wherein the at least one processor is configured to request the advertisement system for the advertisement list, and acquire the advertisement list generated by the advertisement system.

4. The search system according to claim 1, wherein the at least one processor is configured to display the search result screen that does not include the plurality of advertisements when the plurality of advertisements has not been acquired by a predetermined time limit.

5. The search system according to claim 1, wherein the search condition includes a condition of at least one item input from the terminal among a plurality of items, and wherein the at least one processor is configured to, when a condition of a predetermined item is not input from the terminal, acquire at least one advertisement of an item that satisfies a condition of the predetermined item, which is input from the terminal at a time of a past search, and has a stock.

6. The search system according to claim 5, wherein the condition of the predetermined item includes a date of use, and wherein the at least one processor is configured to acquire at least one advertisement of an item in stock on a date of use input from the terminal at the time of the past search, when the date of use is not input from the terminal.

7. The search system according to claim 6, wherein the at least one processor is configured to acquire at least one advertisement of an item that satisfies the search condition and has a stock without using the date of use, when reservation for the date of use input from the terminal is complete.

8. A search method, comprising:

searching a facility database, configured to store information related to information of each search facility, based on a search condition input from a terminal, and obtaining search results based on a match between the search condition and each facility;

obtaining a search list indicating the search results;

determining, based on searching a stock database, configured to store stock information related to a stock of each facility, for each of a plurality of items included in the search results, whether there is a stock of each item;

obtaining an in-stock list indicating which of the plurality of items included in the search results are in stock and have availability, based on the search list and the stock information for each of the plurality of items included in the search results;

acquiring a plurality of advertisements, each of which is associated with a bid price and corresponds to an item that satisfies the search condition, has a stock and has availability, by comparing the in-stock list with an advertisement list, wherein the plurality of advertisements comprises a larger number of advertisements than an upper limit number associated with a search result screen;

assigning a priority to each of the plurality of advertisements based on the bid price associated with each of the plurality of advertisements;

selecting the upper limit number or less of the plurality of advertisements based on the priority associated with each advertisement; and displaying, on the search result screen, at least one item indicated in the in-stock list and the selected advertisements.

9. A non-transitory computer-readable information storage medium for storing a program for causing a computer to:

search a facility database, configured to store information related to information of each search facility, based on a search condition input from a terminal, and obtain search results based on a match between the search condition and each facility;

obtain a search list indicating the search results;

determine, based on searching a stock database, configured to store stock information related to a stock of each facility, for each of a plurality of items included in the search results, whether there is a stock of each item;

obtain an in-stock list indicating which of the plurality of items included in the search results are in stock and have availability, based on the search list and the stock information for each of the plurality of items included in the search results;

acquire a plurality of advertisements, each of which is associated with a bid price and corresponds to an item that satisfies the search condition, has a stock and has availability, by comparing the in-stock list with an advertisement list, wherein the plurality of advertisements comprises a larger number of advertisements than an upper limit number associated with a search result screen;

assign a priority to each of the plurality of advertisements based on the bid price associated with each of the plurality of advertisements;

select the upper limit number or less of the plurality of advertisements based on the priority associated with each advertisement; and display, on the search result screen, at least one item indicated in the in-stock list and the selected advertisements.

10. The search system of claim 3, wherein the search system and the advertisement system share item IDs of the plurality of items, wherein the at least one processor search the database based on the shared item IDs, and wherein the advertisement system generates the advertisement list based on the shared item IDs.

\* \* \* \* \*